United States Patent [19]

Cziptschirsch

[11] 4,070,054
[45] Jan. 24, 1978

[54] BEARING FOR A SUN VISOR BODY OF A MOTOR VEHICLE

[75] Inventor: Kurt Cziptschirsch, Wuppertal, Germany

[73] Assignee: Gebr. Happich GmbH, Germany

[21] Appl. No.: 725,798

[22] Filed: Sept. 23, 1976

[30] Foreign Application Priority Data

Nov. 18, 1975 Germany .............................. 2551633

[51] Int. Cl.² .......................... B60J 3/02; F16C 17/00
[52] U.S. Cl. ...................................... 296/97 K; 308/8; 403/103; 403/329
[58] Field of Search .................... 308/26, 2, 28, 8, 238, 308/1 R, 36; 296/97 H, 97 K; 16/128 R, DIG. 827, 171, 172; 24/201 R, 201 HH, 201 S; 403/92, 93, 84, 103, 329

[56] References Cited

U.S. PATENT DOCUMENTS 2,264,603  12/1941  Westrope ........................ 296/97 K

FOREIGN PATENT DOCUMENTS 2,442,333  3/1975  Germany ........................... 296/97 K
1,354,485  5/1974  United Kingdom ............... 296/97 K Primary Examiner—Trygve M. Blix
Assistant Examiner—Douglas C. Butler
Attorney, Agent, or Firm—Ostrolenk, Faber, Gerb & Soffen

[57] ABSTRACT

A vehicle sun visor is rotatably mounted by a bearing on a spindle; the bearing has a U-shaped spring supported thereon and wrapped about the spindle; the U-shaped spring presses against the spindle; snap together, hook-like fastening elements hold the legs in the U-shaped spring together to squeeze them against the bearing spindle.

15 Claims, 3 Drawing Figures

BEARING FOR A SUN VISOR BODY OF A MOTOR VEHICLE

BACKGROUND OF THE INVENTION

The present invention relates to a bearing for the body of a sun visor used in a motor vehicle, particularly to the spring on the bearing which engages the spindle about which the visor body pivots and most particularly to the structure of such spring.

In order to be able to position a sun visor body at particular pivot orientations and to have the sun visor thereafter resist torque forces that would change the orientation of the visor, as, for example, when the visor has been raised to the up position, a spring is typically used to cooperate with and squeeze against the bearing spindle around which the visor body pivots. Typically, the spring cooperates with an appropriately deformed section of the bearing spindle, e.g., a flattened portion of an otherwise round cross-section bearing spindle.

Federal Republic of Germany Utility Model (Gebrauchsmuster) No. 7,304,223 shows a flat spring of U-shaped cross-section, both of whose legs press against flattened portions of the visor body bearing spindle. For reasons of cost and weight, the spring must be light. To ensure the spring exerts adequate pressure, the free ends of its legs are connected together, but in spaced apart relationship, by a rivet or slip-on connector. This connection of the legs, however, requires additional materials and pieces, additional manufacturing time for the pieces and additional emplacement time for the connections. In articles produced in great quantity, such as sun visors, this can be a high-cost factor.

SUMMARY OF THE INVENTION

According to the present invention, the bearing for the sun visor body is comprised of a bearing spindle which has a deformed, i.e., flattened, portion that is engaged under pressure by a U-shaped spring. The spring is light in weight. The free ends of its legs are secured against spreading apart to increase gripping pressure on the bearing spindle. In accordance with the invention, the additional securement is obtained by means of the free ends of the U-shaped flat spring including appropriate mutual hooking arrangements which, when engaged, prevent separation of the legs of the spring. The hooking arrangements are each part of the respective legs of the spring. Because the hooking arrangement on each leg of the spring is of one piece with the spring, there is no need for additional parts to secure the legs of the spring together, resulting in a substantial saving of costs through elimination of manufacture, intermediate storage and mounting of these additional parts.

In one embodiment, the hooking arrangement on one leg comprises the end of that one leg being bent to define a hook shape and the hooking arrangement on the other leg comprises the end of that other leg being deformed to define an arm which is engaged by the free end of the hook and over which the free end of the hook rides as the two legs of the spring are squeezed together. The free end of the hook finally snaps past the free end of the arm of the hooking arrangement of the other leg of the spring and the legs of the spring are thereby snapped together.

In the preferred embodiments, the arm over which the hook rides is one arm of a V-shaped member defined at the end of the respective leg of the spring by appropriate bending of that leg. The apex of the V-shaped member points to the other leg of the spring. The free end of the hook rides up the arm of the V from the apex toward the free end of the arm until the hook free end snaps past the free end of the arm of the V.

The foregoing design of a bearing spring for a sun visor body is beneficial in several respects. It can be formed by simple bending of the flat bearing spring. The connection of the legs is a simple snap-in spring connection. It is secure. No additional or secondary parts are needed.

Accordingly, it is the primary object of the present invention to enable securement of the body of a sun visor for a motor vehicle at a particular desired pivot orientation with respect to the bearing spindle for the sun visor.

It is another object of the present invention to provide a sun visor body bearing for that purpose.

It is a further object of the present invention to provide a simplified construction for such a bearing.

It is yet another object of the present invention to minimize the number of parts involved in securing the spring.

These and other objects of the present invention are realized and illustrated in the several preferred embodiments shown in the accompanying drawings.

DESCRIPTION OF THE PREFERRED EMBODIMENTS

Figure 1:
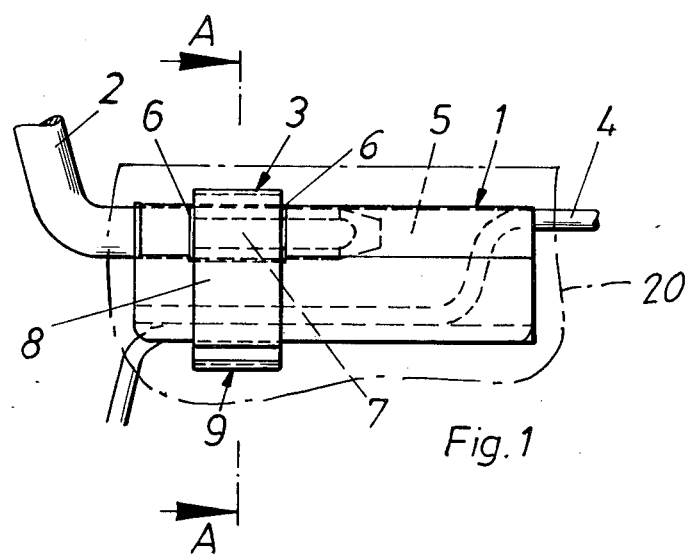
FIG. 1 is a side view of a bearing for a sun visor.
Figure 2:
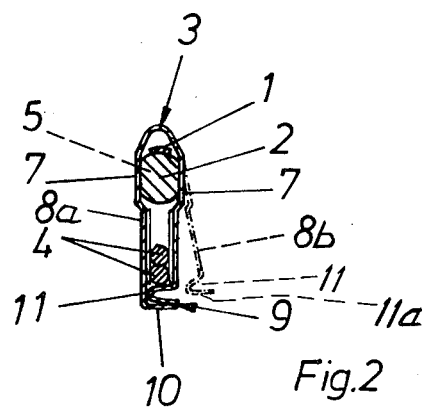
FIG. 2 is a cross-sectional view along the line A—A in FIG. 1.

FIGS. 1 and 2 illustrate a first embodiment of a bearing for a sun visor. The sun visor includes a body 20 attached to the bearing. Referring to FIG. 1, the sun visor bearing includes a bearing body 1, a bearing spindle 2 about which the bearing body pivots, a U-shaped flat spring 3 and a reinforcing insert 4 for the sun visor body.

The bearing body 1 has an approximately U-shaped cross-section. It is made from appropriately bent and shaped sheet metal. At the upper region of body 1, toward the bearing spindle 2, the bearing body 1 has an enlarged, widened cross-section. This defines a widened channel 5 for receiving the bearing spindle 2. Sideways in FIG. 1, along bearing body 1, the portion of the bearing body that is overlapped by below described spring 3 is removed between the edges or discontinuities 6, at both sides of the body with respect to spindle 2, thereby enabling the spring 3 to have access for engagement with the spindle 2.

Coincident with each other and with the space between discontinuities 6, there are deformations comprised of flattened side portions 7 provided on the otherwise generally circular cross-section bearing spindle 2.

A U-shaped, flat spring 3 wraps around spindle 2 and extends down both sides of the bearing body 1. The spring 3 is of a length along the visor body (sideways in FIG. 1) so as to fit in the region between discontinuities 6. There is engagement between spring 3 and the flattened portion 7 of the bearing spindle 2. The spring 3, and particularly its below described hook 10 and hookable element 11 are of elastic, resilient material to enable the snap together engagement of the legs of the spring.

At the end regions of the two legs 8 of the U-shaped flat spring, respective hooking arrangements 9 are integrally formed.

One embodiment of hooking arrangement is illustrated in FIG. 2. One leg 8a of the U-shaped flat spring is bent once toward the other leg 8b at a right angle and then is bent up at another right angle toward the spindle and along the leg 8a to define a short length, upwardly projecting end portion. Both of these bends in legs 8a define the hook 10.

The hookable part of leg 8b comprises a V-shaped hookable member 11, which is defined by bending of leg 8b. The upper arm of the V extends from the spring leg 8b to the apex of the V. The apex of the V is directed toward the opposite spring leg 8a. The lower arm 11a of the V is located to be in opposition to the hook 10 and to act as an elastically deformable run-up slope. When the legs 8a, 8b are moved together, the free end of the hook 10 first engages the arm 11a toward the apex of the V and moves along the arm 11a toward the free end of that arm and then snaps thereover. The length of the arm 11a from the apex of the V to the end of arm 11a corresponds approximately to the length of the interior of the bottom part of the hook 10 so that the hook and hookable element on legs 8a, 8b may nest securely together, as shown in FIG. 2. The length of the arm 11a is chosen so that when the hook 10 finally runs up the slope of the arm 11a and hooks over the free end of the arm 11a, at that time the legs of the spring 3 have securely engaged against the flattened portions of the bearing spindle.

Figure 3:
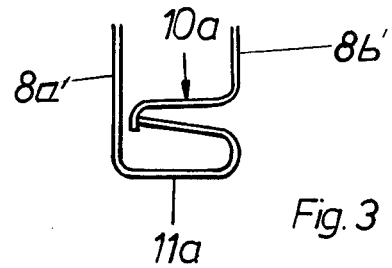
FIG. 3 is an enlarged fragmentary end view of another embodiment of spring for a sun visor bearing.

A second embodiment of hooking arrangement according to the present invention is shown in FIG. 3. It has the same type of snap together connection of the legs of the spring as the first embodiment, wherein a hook rides up an arm of the V-shaped member from its apex toward its free end. In this embodiment, the orientations of the hook and the V-shaped member are somewhat reversed. In the second embodiment, in place of hook 10, leg 8b' has a hook 10a which includes an arm bent at a right angle from the leg 8b' and extending toward the leg 8a' and further includes a short length, downwardly extending final hook portion at the end of leg 8b', which final hook portion is bent at a right angle to the arm of the hook 10a. Hook 10a terminates in a free end.

The hookable portion comprises the V-shaped member 11a, having one arm that is attached to and extends from the spring leg 8a' toward the leg 8b', and having an apex that extends toward the leg 8b'. As legs 8a' and 8b' are moved together, the free end of hook 10a rides up the adjacent free to flex arm of elastic V-shaped member 11a until hook 10a finally snaps into place past the free end of the upper arm of member 11a.

In both embodiments, all hook and hookable portions are of one piece with the respective leg of the bearing spring 3.

Although a plurality embodiments of this invention have been described, many variations and modifications will now be apparent to those skilled in the art, and it is therefore preferred that this instant invention be limited not by the specific disclosure herein but only by the appended claims.

I claim:

1. A bearing for a sun visor body, comprising:
a spindle about which the visor body is pivotable; a bearing body wrapped about said spindle; a bearing spring; means in said body for receiving said bearing spring and for permitting access by said spring to said spindle;
said spring comprising:
a U-shaped length of material having two legs; said spring receiving said spindle between its said legs;
a hook on one said spring leg; a hookable member on the other said spring leg; said hookable member being shaped and positioned such that as said spring legs are brought toward each other, said hook and said hookable member snap together, thereby to hold said legs tightly against said spindle therebetween.

2. The bearing for a sun visor body of claim 1, wherein said hookable member comprises an arm attached to said other spring leg and said arm having a first free end; said arm extending generally across the direction of extension of said spring legs;
said hook including a second free end, which is engagable with said arm and which is positioned to override said arm toward its said first free end as said spring legs are moved together, until said second free end moves past said first free end and said first free end engages said hook, whereby said hook and said hookable member are thereafter hooked together.

3. The bearing for a sun visor body of claim 1, wherein said hookable member comprises a generally V-shaped member with an apex and with one arm being said arm and with the other arm being attached to said other spring leg; both said arms of said V-shaped member extending away from said apex; said first arm of said V-shaped member terminating in said first free end; said apex of said V-shaped member extending toward said one spring leg.

4. The bearing for a sun visor body of claim 3, wherein said hookable member is comprised of resilient material; said one arm being normally biased toward said hook second free end when they are in engagement; said hook being comprised of resilient material and its said second end being normally biased toward said hookable member free arm when they are in engagement, whereby said hook and said hookable member snap fasten together as said second free end rides past said first free end.

5. The bearing for a sun visor body of claim 4, wherein the entire said spring, including said hook and said hookable member, is a single integral piece.

6. The bearing for a sun visor body of claim 5, wherein the entire said spring is comprised of resilient material.

7. The bearing for a sun visor body of claim 5, wherein said spring is comprised so as to normally urge said spring legs apart and the said bringing together of said spring legs for snapping together said hook and said hookable member urges said spring legs against their normal spring bias.

8. The bearing for a sun visor body of claim 4, wherein said means of said body for receiving said bearing spring comprises an opening in said bearing body at said spindle; said spring being located at said opening in said bearing body and being in engagement with said spindle at said opening.

9. The bearing for a sun visor body of claim 4, wherein said spindle is of non-circular exterior profile at the place along the length of said spindle with which said spring is in engagement.

10. The bearing for a sun visor body of claim 4, wherein said hook is comprised of a first bend in said one spring leg at right angles to the direction of extension of said one leg and defining a portion extending toward said other spring leg and a second right angle bend, spaced from said first bend and closer to said second free end, at right angles to said portion of said one leg.

11. The bearing for a sun visor body of claim 10, wherein said second bend is directed to cause said second free end to point generally back along said one leg toward said spindle.

12. The bearing for a sun visor body of claim 10, wherein said second bend is directed to cause said second free end to point generally away from said spindle.

13. The bearing for a sun visor body of claim 10, wherein said V-shaped member is oriented to extend generally sideways to said other leg of said spring.

14. The bearing for a sun visor body of claim 10, wherein said spring is comprised so as to normally urge said spring legs apart and the said bringing together of said spring legs for snapping together said hook and said hookable member urges said spring legs against their normal spring bias.

15. The bearing for a sun visor body of claim 1, wherein said spring is comprised so as to normally urge said spring legs apart and the said bringing together of said spring legs for snapping together said hook and said hookable member urges said spring legs against their normal spring bias.

* * * * *